(12) United States Patent
Zhou et al.

(10) Patent No.: US 9,964,098 B2
(45) Date of Patent: May 8, 2018

(54) METHOD OF CONTROLLING A WIND TURBINE, AND A WIND TURBINE

(71) Applicant: VESTAS WIND SYSTEMS A/S, Aarhus N (DK)

(72) Inventors: Yu Zhou, Singapore (SG); Wanying Chen, Singapore (SG); K. J. Karthik, Trivandrum (IN); Amit Kalyani, Maharashtra (IN); Khoon Peng Lim, Singapore (SG); Pey Yen Siew, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 727 days.

(21) Appl. No.: 14/365,865

(22) PCT Filed: Dec. 18, 2012

(86) PCT No.: PCT/DK2012/050473
§ 371 (c)(1),
(2) Date: Jun. 16, 2014

(87) PCT Pub. No.: WO2013/091644
PCT Pub. Date: Jun. 27, 2013

(65) Prior Publication Data
US 2015/0110624 A1 Apr. 23, 2015

Related U.S. Application Data

(60) Provisional application No. 61/578,237, filed on Dec. 21, 2011.

(30) Foreign Application Priority Data

Dec. 20, 2011 (DK) .................................. 2011 70728

(51) Int. Cl.
*F03D 80/40* (2016.01)
*F03D 7/02* (2006.01)
*F03D 7/04* (2006.01)

(52) U.S. Cl.
CPC .......... *F03D 80/40* (2016.05); *F03D 7/0224* (2013.01); *F03D 7/042* (2013.01); *Y02E 10/723* (2013.01)

(58) Field of Classification Search
None
See application file for complete search history.

(56) References Cited

U.S. PATENT DOCUMENTS 6,890,152 B1 5/2005 Thisted
8,500,402 B2 * 8/2013 Wobben .................. G01W 1/00
415/118

(Continued)

FOREIGN PATENT DOCUMENTS

| CA | 2785916 A1 * | 8/2011 | .......... F03D 7/0224 |
| WO | 2009043352 A2 | 4/2009 | |
| WO | 2011/117246 A2 | 9/2011 | |

OTHER PUBLICATIONS

Homola, M.C. et al.: "Ice Sensors for Wind Turbines", Cold Regions Science and Technology, Elsevier, Amsterdam, NL, vol. 46, No. 2, Nov. 1, 2006, pp. 125-131.

(Continued)

*Primary Examiner* — Justin Seabe
*Assistant Examiner* — Juan G Flores
(74) *Attorney, Agent, or Firm* — Patterson + Sheridan, LLP

(57) ABSTRACT

The present invention relates to a method of controlling a wind turbine having at least one blade and a controller, including: detect location of foreign material adhered to the blade by sensors mounted on the blade and communicatively coupled to the controller; determine the resonance mode of (Continued)

the blade to be excited based on the location of the foreign material by the controller; and excite the blade to the resonance mode; wherein the resonance mode is one higher than the first order resonance mode. The present invention also relates to a wind turbine using the method.

19 Claims, 8 Drawing Sheets

(56) References Cited

U.S. PATENT DOCUMENTS

| | | |
|---|---|---|
| 8,641,376 B2* | 2/2014 | Baba ................. F01D 11/00 416/39 |
| 9,074,583 B2* | 7/2015 | Von Mutius .......... F03D 7/0224 |
| 2010/0140936 A1* | 6/2010 | Benito ................. F03D 17/00 290/44 |
| 2010/0189560 A1 | 7/2010 | Haraguchi |
| 2011/0182732 A1* | 7/2011 | Baba ................. F01D 11/00 416/39 |
| 2013/0195657 A1* | 8/2013 | Lauritsen ............... F03D 7/042 416/1 |

OTHER PUBLICATIONS

International Search Report for PCT/DK2012/050473, dated Mar. 19, 2013.
Danish Search Report for PA 2011 70728, dated Sep. 18, 2012.

* cited by examiner

METHOD OF CONTROLLING A WIND TURBINE, AND A WIND TURBINE

FIELD OF THE INVENTION

The present invention relates generally to wind turbines. More specifically, this invention relates to a method of controlling a wind turbine in order to remove ice or other foreign material from a blade, and to a wind turbine so controlled.

BACKGROUND OF THE INVENTION

Wind energy as a renewable form of energy has a low environmental impact and thus has achieved more acceptances recently. As wind capturer, blades are designed to provide maximum efficiency of lift with a clean and smooth surface. Presence of dirt, ice etc. often decreases efficiency of energy production. In certain sites in particular weather conditions, ice build-up is so severe that it prevents the turbines from producing power despite the existence of ideal wind conditions. In addition, the imbalance of rotor due to ice and/or dirt may cause stress of both blades and drive train.

Existing technologies for keeping blades clean have various disadvantageous. For example, a specially made vehicle and tools were employed for blade cleaning, but this entails the use of extra workers and tools for cleaning.

SUMMARY OF THE INVENTION

An object of the present invention is, at least partly, to overcome the above disadvantages and drawbacks of the prior art and to provide a method and system to remove foreign material from the blade efficiently and cost-effectively.

The above object, together with numerous other objects, advantages, and features, which will become evident from the below description, is accomplished by a solution in accordance with the present invention by a method of controlling a wind turbine having at least one blade and a controller to effect removal of ice or other foreign material from a blade, the method includes detecting the location of ice or other foreign material adhered to the blade by sensors mounted on the blade and communicatively coupled to the controller; determining the resonance mode of the blade to be excited based on the location of the ice or other foreign material by the controller; and exciting the blade to the desired resonance mode; wherein the resonance mode is one higher than the first order resonance mode.

By selecting the relevant resonance mode or modes of the blade to be excited, the blade can be excited to vibrate in the optimal mode for effective removal of the ice or other foreign material such as dirt from the locations identified. (For the purpose of concision, hereinafter, the term "excite to" or similar should be understood as not limited to excitation at the precise frequency of maximum amplitude but also at frequencies close thereto at which resonance phenomena is observed).

Also, considering the potential damage to the blade due to resonance, choosing the optimal mode can effectively avoid the damage to blade because the higher order resonance mode, the lower amplitude of the vibration, and thus less potential damage to the blade.

In one embodiment, the step of determining the resonance mode includes comparing the location of the ice or other foreign material with resonance nodes of the blade under various resonance modes; and determining the resonance mode based on the location of resonance nodes relative to the location of the detected ice or other foreign material. The resonance mode selected is the one having a node or nodes closest to the location of the ice or other foreign material. In another embodiment, the step of determining the resonance mode includes comparing the location of the ice or other foreign material with the positions of maximum displacement of the blade under various resonance modes; and determining the resonance mode based on the positions of maximum displacement location relative to the location of the foreign material. The mode selected may be that for which the maximum displacement locations may be the one closest to or provide the best fit with the location or locations of the foreign material.

The resonance mode of the blade to be excited may include two or more resonance modes.

In one embodiment, if the foreign material is detected on the blade root, blade tip, and middle area, the second order resonance mode will be excited; while if the foreign material is detected on almost the whole blade, the fourth or higher order resonance mode will be excited.

The various resonance modes may include flapwise, edgewise, or torsional resonance, or any of their combination.

In one embodiment, the resonance of the blade is excited through a blade pitch system which rotates the blade around its axis and is communicatively coupled to the controller. Preferably, the blade pitch system scans around natural frequency of the resonance mode to be excited. More preferably, the blade pitch system pitches the blade at or close to the natural frequency of the determined resonance mode for a short period of time, pauses, and then repeats the pitching process, to avoid risk of damage to the blade.

In another embodiment, the resonance of the blade is excited through a blade pitch system which rotates the blade around its axis and is communicatively coupled to the controller, and the blade pitch system scans around natural frequencies of the determined two or more resonance modes.

The resonance of the blade may also be excited through external exciters attached onto the blade or independent of the blade.

In one embodiment, detecting location of foreign material adhered to the blade is done by sensors mounted on the blade, such as optical sensors.

The method can be repeatedly implemented until all foreign materials are removed satisfactorily.

The present invention also claims a wind turbine, including at least one blade having sensors mounted thereon for detecting ice or other foreign material adhered to the blade; a blade pitch system which rotates the blade around its axis; and a controller communicatively coupled to the blade pitch system and the sensors, which can control the blade pitch system to excite the blade to a resonance mode or modes higher than the first order resonance mode according to location of detected foreign material.

In one embodiment, the controller stores data regarding various blade resonance modes and their nodes, and the controller compares the location of the foreign material with the various resonance nodes of the blade, and then determines resonance mode of the blade to be excited based on the relative location of the resonance node relative to the location of the foreign material.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF EMBODIMENTS

Devices and methods for removing foreign material from wind turbine blades are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form rather than in detail, in order to avoid obscuring the present invention.

Figure 1:
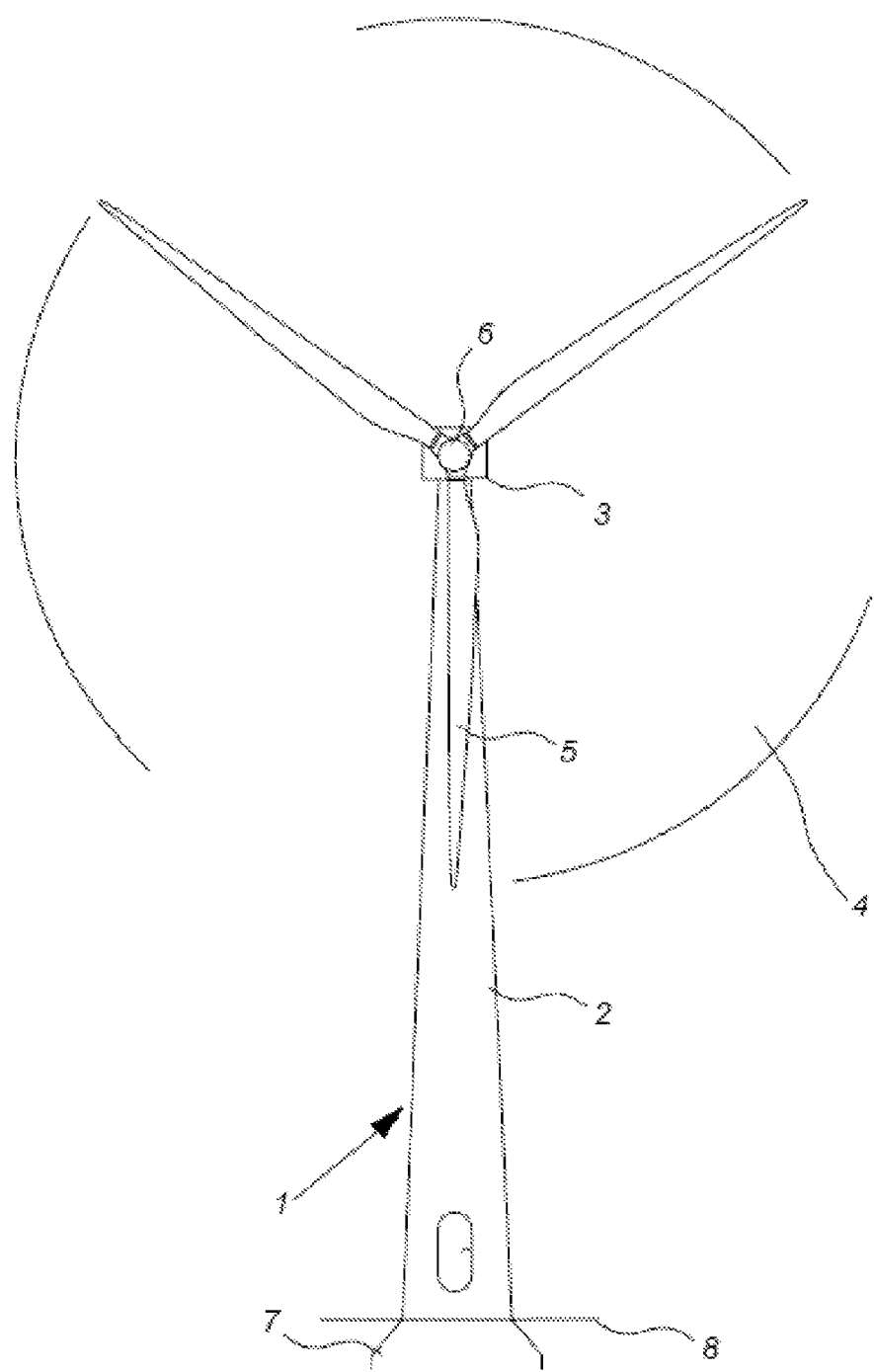
FIG. 1 is an illustration of a wind turbine.

FIG. 1 illustrates a wind turbine 1, comprising a wind turbine tower 2 and a wind turbine nacelle 3 positioned on top of the tower 2. The wind turbine rotor 4 comprises at least one wind turbine blade e.g. three wind turbine blades 5 as illustrated in the figure. The blades 5 are mounted on a hub 6, which is connected to the nacelle 3 through the low speed shaft extending out of the nacelle front. The wind turbine tower 2 is erected on a foundation 7 either at ground level or at sea level 8 according to whether the wind turbine is of an onshore or an offshore type.

The wind, acting on blades 5, supplies a torque to the main shaft which turns a transmission that is connected by a coupling to a generator. The electrical power generated by the generator can then be delivered to an electrical grid or any other load.

Figure 8:
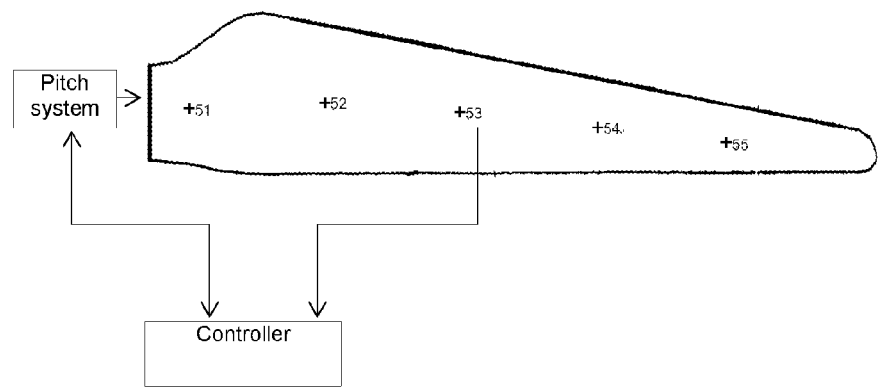
FIG. 8 is a simplified illustration of a blade control system.

According to one embodiment, the illustrated wind turbine 1 is pitch controlled in that each blade 5 is connected to a pitch system (not illustrated in FIG. 1, refer to FIG. 8) for rotating the blade 5 around its longitudinal axis as is conventional in the field. Control of the pitch is effected according to a control scheme dependent on blade azimuth, wind speed, desired power output, rotational speed etc, as is known to the skilled person in the art.

According to one embodiment of the invention, a sensing system is provided comprising sensors 51-55 positioned on predetermined locations of the blades to detect the presence of ice. In one form sensors 51-55 may be optical transducer probes, which have no moving parts, are completely solid and their principle of operation is entirely optical. Intrusive to the airstream and hermetically sealed, such a sensing system uses un-collimated light to monitor the opacity and optical refractive index of the substance on the probe. It is de-sensitized to ignore a film of water. The sensor works as a combined optical spectrometer and optical switch. A change in opacity registers as rime ice. A change in refractive index registers as clear ice. Optical components can be made of acrylic glass. By using a sensor system comprising a number of sensors distributed over the blade it becomes possible to determine at least the approximate location/distribution of ice on the blade. As an alternative, a sensing system using magnetostrictive technology may be used, sensors 51-55 comprise probes driven to resonate at their natural frequency. As ice accretes on the probe, a shift in resonance frequency occurs. When the resonance frequency reaches a setpoint, an ice signal is activated. It will be appreciated that various other ways to detect ice may also be used. It should be well understood that the above are examplary only, the amount, type, and location of sensors can be changed.

Where detection of other foreign material such as dirt is desired the sensor system is appropriately selected or adapted.

The wind turbine 1 includes a blade control system having a controller (refer to FIG. 8) which may be a microcomputer including a processor (CPU), a data storage device such as ROM and/or RAM, a display and interfaces therebetween etc. The controller may have stored data regarding various parameters of the blade, including the location of its first order resonance nodes, second order resonance nodes, third order resonance nodes, fourth order resonance nodes, etc. Alternatively, the data regarding various parameters of the blade may be stored on other independent storage medium and be referenced by the controller. The controller is communicatively coupled to various sensors on the blade (shown below) and the pitch system and obtains data from them, and sends out signals to control the pitch system.

In operation a turbine blade can undergo a variety of oscillations in response to external forces, including aerodynamic forces as well as other interactions, for example movement of the nacelle and hub, due to tower oscillation. These oscillations can exhibit resonances. For example, a blade can be excited to various resonance modes, such as second order resonance mode and third or even higher resonance mode. FIGS. 3-6 exemplarily illustrate various blade resonance modes of a blade according to a modelling technique. Under different resonance modes, a blade has different resonance nodes distributed along the blade. Also, as a multiple degree-of-freedom system, a blade has flapwise, edgewise, and torsional resonances, and the resonance nodes for each of them may be different.

Figure 2:
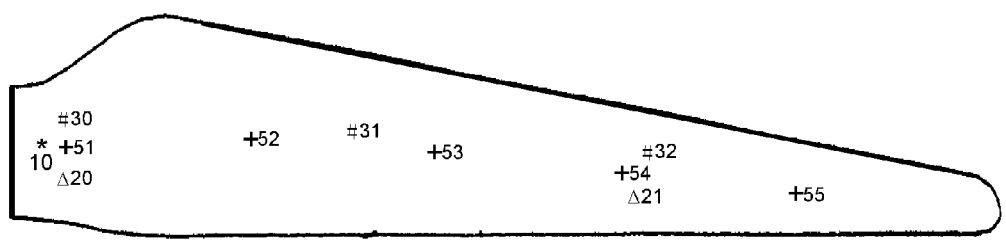
FIG. 2 is an illustration of a blade where sensors and some resonance nodes are schematically labeled thereon.
Figure 3:
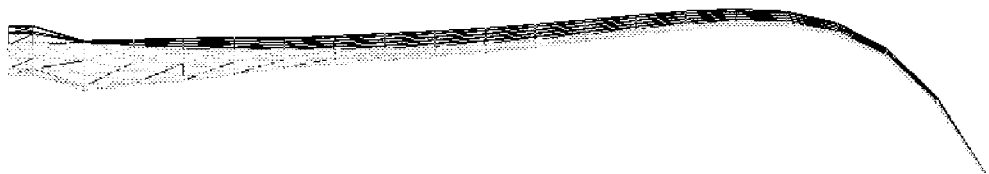
FIG. 3 is an examplary illustration of flapwise, second order resonance mode of the blade.
Figure 4:
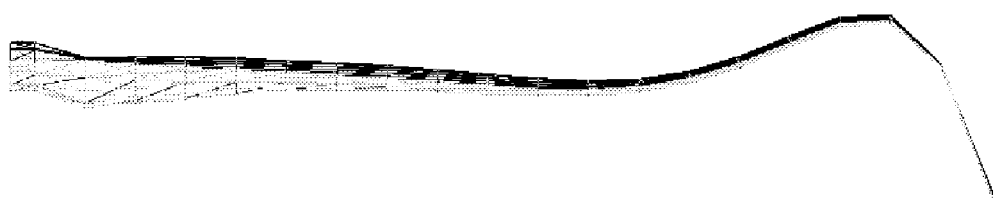
FIG. 4 is an examplary illustration of flapwise, third order resonance mode of the blade.

For illustrative purpose of the present invention, as shown in FIG. 2, the edgewise first order resonance node 10 is labeled with "*", the edgewise second order resonance nodes 20 and 21 are labeled with "Δ"; and the edgewise third order resonance nodes 30, 31, and 32 are labeled with "#". Higher order resonance nodes can be labeled and stored in the controller. To be noted, the above resonance nodes are identified in the figure for illustration purpose only rather than being represented as an accurate indication of its actual location. The accurate location of various resonance nodes can be derived by modal analysis such as FEA or various calculations known in the field.

In power-generating operation it is desired to avoid these resonances. The present invention however seeks to excite a selected blade resonance based on the location of foreign material, such as ice or dirt on the blade, so as to remove the foreign material from the the blade. Higher order resonance modes are preferred because the higher order resonance mode, the lower amplitude of the vibration, and thus less potential damage to the blade.

For example, if only the sensor 51 which is located at the root part of the blade detects the presence of ice, the controller will compare ice location with the stored data of various resonance nodes. In this case, since the the location of ice is very close to the second/third order resonance node, the second/third order resonance mode will be excited. If both the sensor 51 and sensor 52 detect the presence of ice, then the third order resonance mode will be excited since the ice locations are close to the two third order resonance nodes. If the sensors indicate ice exists on the whole blade, then the fourth or higher order resonance mode can be excited.

Since the location, i.e. coordinate, of each resonance nodes of the blade have been pre-stored in the controller, and location of every sensor on the blade has also been pre-defined and stored in the controller, the resonance mode to be excited can be identified by comparing location of the ice or other foreign material with various resonance nodes. Various algorithms can be used to determine the resonance mode to be excited by identifying those modes having resonance nodes compatible with locations of ice or other material. For example, if location of ice is closest to a resonance node of a resonance mode, the resonance mode may be identified as the one to be excited. For ice of multiple locations, the distance between location of ice and resonance nodes of each resonance mode can be calculated, and then an average distance may be calculated for each resonance mode. The resonance mode with the minimum average distance may be determined as the one to be excited. Alternatively, an acceptable average distance may be pre-defined, and among those modes having the acceptable average distance, the resonance mode with the minimum standard deviation may be determined as the one to be excited. A corresponding control strategy, such as those mentioned above, may be stored in the controller and utilized thereby.

To excite the blade resonance, the pitch system could work as an excitation source, while external vibrators can be used as well. For example, vibrators may be attached onto the blade.

Taking the pitch system as an example, once the resonance mode to be excited is established by the controller, a blade pitching cycle frequency is calculated based on the frequency of the resonance mode that needs to be excited. Then, the controller will send blade pitch profile to set the pitch control target or reference so that the pitch system will swing the blade at the cycle frequency. For example, the pitch system will start to swing the blade at a lower frequency than desired resonance mode and slowly increase the frequency till the resonance mode is achieved. The blade resonance is monitored by a vibration sensor or strain sensor that can be installed at the blade where the vibration changes or stress can be easily detected. Taking the vibration accelerometer as an example, the vibration sensor can be installed in the blade at any place as long as it does not lie in the mode nodes. The vibration level (calculated in root mean square value-RMS) around the excited natural frequency range will be monitored during the ice/dirt removing stage. When the large increase of the vibration is observed, the blade resonance is excited. The frequency is then held at or close to this resonant frequency for a short period to let the blade vibrate. To avoid damage to the blade, the resonance may last for a short period of time, such as 2 seconds, stop for a while, and then repeated.

Figure 5:
FIG. 5 is an examplary illustration of edgewise, second order resonance mode of the blade.
Figure 6:
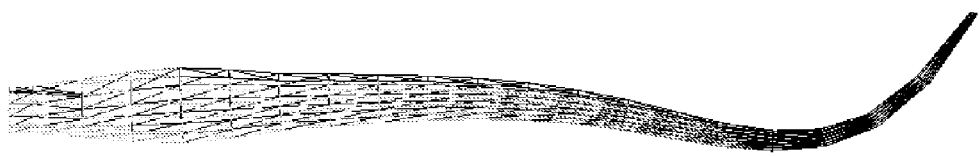
FIG. 6 is an examplary illustration of edgewise, third order resonance mode of the blade.
Figure 7:
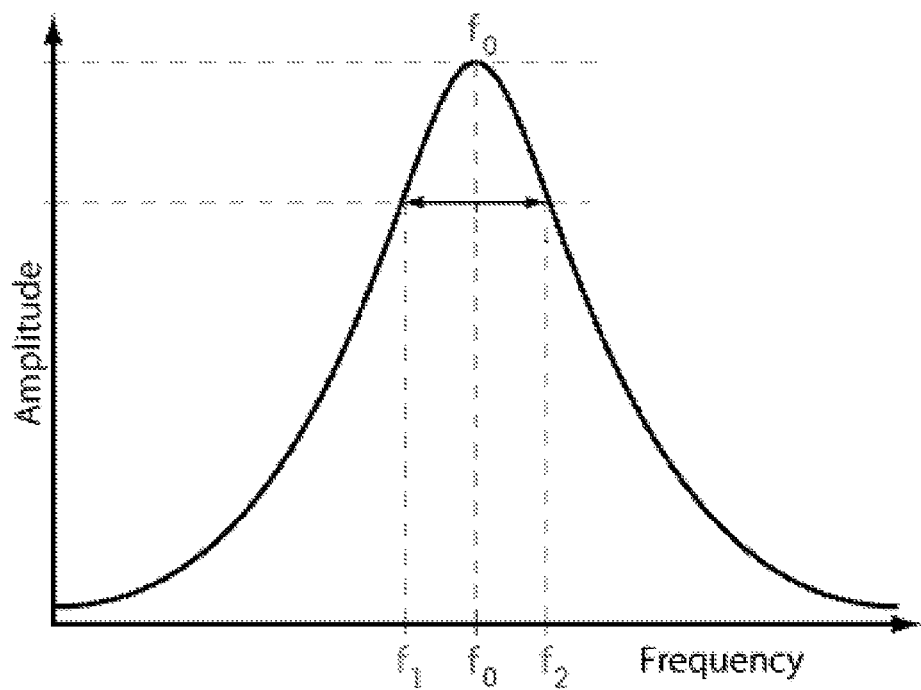
FIG. 7 is an exemplary illustration of the relationship between amplitude and frequency.

It should be understood that although the vibration amplitude is maximum at the exact resonant state, an amplitude close to the maximum, as shown in FIG. 7 an amplitude corresponding to a frequency between $f_1$ to $f_2$, such as a ±20% to the maximum amplitude at the resonance frequency $f_0$, is also within the scope of present invention. Put another way, the frequency used to activate the resonance mode is not necessarily to be the exact resonance frequency, rather it could be one close, such as a ±20%, to the resonance frequency, as long as the ice or other foreign material can be removed. For example, the resonance frequency of the edgewise, second order resonance mode of the blade shown in FIG. 5 is about 6 Hz, the actual frequency used to activate the second order resonance mode could be variable from 5 Hz to 7 Hz.

In some instances, the location of foreign material such as ice may be compatible with two or more resonance modes simultaneously. Under such situation, the two or more resonance modes can be excited by pitching the blade with a frequency range covering the natural frequencies of the two or more resonance modes.

Since a blade has flapwise, edgewise, and torsional resonances and the resonance frequency for each of them are different, preferably each of flapwise, edgewise, and torsional resonances are treated differently so that the cleaning process can be optimized. For example, the frequencies of torsional modes are generally higher than bending modes, and pitching activity can easily excite the torsional mode since the axis of action of moment is same as the torsional axis of blade. Certainly, in practice, if the frequency difference is not significant, for example, both the flapwise and edgewise resonances may be excited by scanning a narrow frequency range.

The above illustrates how the process is applied particularly to ice removal. It may however be that ice and dirt are treated differently due to their different properties. More specifically, ice on the blade ideally needs to be broken before being shaken off, while dirt usually needs only to be shaken off. For the ice to be broken, it is better for a resonance node, where acceleration is at maximum, to be arranged at the position of the ice; while for the dirt to be shaken off, it is better for a position of high or maximum amplitude to be located at the location of the dirt to be removed.

What is claimed is:

1. A method of controlling a wind turbine having a blade and a controller to effect removal of foreign material from the blade, the method including:
   detecting, using sensors mounted on the blade and communicatively coupled with the controller, a location of the foreign material that is adhered to the blade;
   selecting, using the detected location of the foreign material, a resonance mode of a plurality of predefined resonance modes of the blade, wherein the selected resonance mode is greater than a first order resonance mode; and
   exciting the blade to the selected resonance mode.

2. The method according to claim 1, wherein selecting the resonance mode includes:
   comparing the detected location of the foreign material with a plurality of locations corresponding to a plurality of resonance nodes of the blade under the plurality of predefined resonance modes.

3. The method according to claim 2, wherein the resonance mode is selected based on one or more resonance nodes of the plurality of resonance nodes that are closest to the detected location of the foreign material.

4. The method according to claim 2, wherein the foreign material is ice.

5. The method according to claim 1, wherein selecting the resonance mode includes:

comparing the detected location of the foreign material with a plurality of positions of maximum displacement of the blade under the plurality of predefined resonance modes.

6. The method according to claim 5, wherein the resonance mode is selected based on one or more positions of the plurality of positions that are closest to the detected location of the foreign material.

7. The method according to claim 5, wherein the foreign material is dirt.

8. The method according to claim 1, wherein selecting the resonance mode of the plurality of predefined resonance modes comprises selecting at least two resonance modes, and
   wherein exciting the blade to the selected resonance mode comprises exciting the blade to the at least two selected resonance modes.

9. The method according to claim 8, wherein the blade is excited to the selected resonance mode using a blade pitch system, and
   wherein the blade pitch system is communicatively coupled with the controller and configured to rotate the blade around its axis at frequencies close to natural frequencies of the at least two selected resonance modes.

10. The method according to claim 1, wherein exciting the blade to the selected resonance mode comprises:
   when the detected location corresponds to one of a blade root, a blade tip, and a middle area of the blade, exciting the blade to a second order resonance mode; and
   when the detected location indicates that an extent of the foreign material corresponds to at least a predetermined portion of the blade, exciting the blade to a fourth or higher order resonance mode.

11. The method according to claim 1, wherein the plurality of predefined resonance modes includes at least one of flapwise, edgewise, or torsional resonance.

12. The method according to claim 1, wherein the blade is excited to the selected resonance mode using a blade pitch system, wherein the blade pitch system is configured to rotate the blade around its axis and is communicatively coupled to the controller.

13. The method according to claim 12, wherein exciting the blade to the selected resonance mode comprises:
   pitching, using the blade pitch system, the blade around its axis at or near a natural frequency of the selected resonance mode for a first period of time,
   pausing the pitching for a second period of time, and
   repeating the pitching and pausing.

14. The method according to claim 1, wherein the blade is excited to the selected resonance mode using one or more external exciters communicatively coupled with the controller, and
   wherein the one or more external exciters are one of attached onto the blade or independent of the blade.

15. The method according to claim 1, wherein the sensors are optical sensors.

16. The method according to claim 1, wherein the controller stores data related to a plurality of resonance nodes of the blade.

17. A wind turbine, including:
   at least one blade having sensors mounted thereon, the sensors configured to detect at least one location of foreign material that is adhered to the at least one blade;
   a blade pitch system configured to rotate the at least one blade around its axis; and
   a controller communicatively coupled to the blade pitch system and to the sensors, wherein the controller is operable to:
      select, using the detected at least one location of the foreign material, one or more resonance modes of a plurality of predefined resonance modes of the blade, wherein the one or more resonance modes are greater than a first order resonance mode; and
      control the blade pitch system to excite the blade to the selected one or more resonance modes.

18. The wind turbine according to claim 17, wherein the controller stores data related to a plurality of locations of a plurality of resonance nodes of the blade, and wherein the controller is further operable to:
   compare the detected at least one location of the foreign material with the plurality of locations of the plurality of resonance nodes of the blade, and
   select the one or more resonance modes based on the comparison of the plurality of locations with the detected location of the foreign material.

19. The wind turbine according to claim 17, wherein the sensors are arranged along a span of the at least one blade.

* * * * *